United States Patent [19]

Pham et al.

[11] Patent Number: 6,091,039
[45] Date of Patent: Jul. 18, 2000

[54] GAS-INSULATED LINE WITH AN INCORPORATED POWER CAPACITOR AND CIRCUIT BREAKER

[75] Inventors: Van Doan Pham, Meyzieu; Marcel Guillen, Pont-Eveque; Michel Collet, Lyons, all of France

[73] Assignee: GEC Alsthom T & D SA, Paris, France

[21] Appl. No.: 09/186,418

[22] Filed: Nov. 5, 1998

[30] Foreign Application Priority Data

Nov. 6, 1997 [FR] France ................................ 97 13983

[51] Int. Cl.$^7$ ............................ H01H 33/16; H02B 5/00; H02B 13/035
[52] U.S. Cl. ............................ 218/145; 218/43; 218/144; 361/605; 361/618
[58] Field of Search .................... 174/24–28; 218/43–84, 218/143, 144, 145; 307/147; 361/604–618

[56] References Cited

U.S. PATENT DOCUMENTS

| | | | |
|---|---|---|---|
| 3,829,707 | 8/1974 | Pflanz | 307/147 |
| 4,078,184 | 3/1978 | Phelps et al. | 307/147 |
| 4,439,651 | 3/1984 | Thuries et al. | 218/143 |
| 5,170,023 | 12/1992 | Pham et al. | 218/143 |
| 5,235,147 | 8/1993 | Pham et al. | 218/144 |
| 5,728,989 | 3/1998 | Utsumi et al. | 218/145 |

FOREIGN PATENT DOCUMENTS

| | | |
|---|---|---|
| 0 417 813 A2 | 3/1991 | European Pat. Off. . |
| 0 750 380 A1 | 12/1996 | European Pat. Off. . |
| 2 685 562 | 6/1993 | France . |
| 2 273 615 | 6/1994 | United Kingdom . |

Primary Examiner—J. R. Scott
Attorney, Agent, or Firm—Sughrue, Mion, Zinn, Macpeak & Seas, PLLC

[57] ABSTRACT

The gas-insulated line comprises a conductor (1A) disposed inside a case (3A) filled with a dielectric gas under pressure. A power capacitor (5) is electrically connected to the conductor while being disposed inside a compartment (3P) secured to the case (3A) and filled with a dielectric gas under pressure. The dielectric gas present in the compartment (3P) provides electrical insulation for the compartment relative to the power capacitor (5). In this way, electrical insulation of the gas-insulated line between the conductor (1A) and the case (3A) is maintained inside the compartment (3P) in which the power capacitor (5) and the conductor (1A) are electrically interconnected. This results in the gas-insulated line of the invention retaining small bulk and the ability to be used on the ground or buried.

20 Claims, 4 Drawing Sheets

GAS-INSULATED LINE WITH AN INCORPORATED POWER CAPACITOR AND CIRCUIT BREAKER

BACKGROUND OF THE INVENTION

The invention relates to a gas-insulated line in a grid for transporting electrical power, the line comprising a conductor placed inside a case filled with a dielectric gas under pressure.

In such a line, electricity is transported by the conductor while the case is placed at zero potential. The nature and the pressure of the dielectric gas are selected as a function of the voltage which exists between the conductor and the case so as to guarantee electrical insulation. By way of example, a case having a diameter of about 1 meter (m) and filled with a mixture of nitrogen ($N_2$) containing 2 percent (%) to 5% sulfur hexafluoride ($SF_6$) at a pressure of 12 bars enables an aluminum conductor transporting power of the order of 1000 megawatts (MW) to 2000 MW at a voltage of about 400,000 volts (V) to be insulated. It will thus be understood that the zero potential of the case and its small size mean that the gas-insulated line is used on the ground or even buried. In this way, developing or renovating electrical power transport grids by means of gas-insulated lines makes it possible to provide better environmental protection.

It is well known that loads such as evacuated transformers fed by a distribution network itself connected to the transport grid give rise to reactive power. In power transport grids using overhead lines, a power capacitor is electrically connected to the line conductor to compensate the reactive power consumed by the loads, thus making it possible to reduce the amount of reactive power transiting via the grid to the benefit of active power transit. Power capacitors enable the transport capacity of the grid to be used more effectively and they limit the appearance of electrical voltage instabilities when the grid is being used to the limit of its capacity.

Overhead electricity lines have little inherent capacitive behavior so their contribution to supplying the transport grid with capacitive reactive power remains limited compared with the contribution of power capacitors.

Unlike overhead lines, gas-insulated lines have the advantage of directly providing capacitive reactive power to the power transport grid. Their capacitive behavior is about four times greater than that of an overhead line. By way of example, a 2000 MW overhead line transporting electricity at 400,000 V presents linear capacitance of about 13,000 picofarads per kilometer (pF/km), whereas for a gas-insulated line, under the same electrical voltage and power conditions, the linear capacitance is 50,000 pF/km. However, in the event that the reactive power supplied by the gas-insulated line is not sufficient on its own to compensate for the inductive reactive power load on the transport grid, as is frequently the case, it is still necessary to connect a power capacitor to the line.

Overhead lines use power capacitors which are generally in the form of batteries made up of unit capacitors coupled together in series and in parallel, and which are connected to the transport grid via a circuit breaker. A frame supports the batteries at a distance from the ground so that any risk of short circuit through atmospheric air between a battery and ground is avoided, particularly when the transport grid operates at a voltage of about 400,000 V. The impossibility of placing such batteries on the ground, and a fortiori of burying them, constitutes a problem for connecting a power capacitor to a gas-insulated line.

SUMMARY OF THE INVENTION

The object of the invention is to provide a gas-insulated line which is connected to a power capacitor in such a manner that its size and its use remain unaffected when it is used at ground level or buried underground.

To this end, the invention provides a gas-insulated line of an electrical power transport grid, the line comprising a conductor disposed inside a case filled with a dielectric gas under pressure, the line being characterized in that a power capacitor is electrically connected to the conductor, being disposed inside a compartment secured to the case and filled with dielectric gas under pressure.

The dielectric gas present in the compartment provides it with electrical insulation relative to the power capacitor. In this manner, the electrical insulation of the gas-insulated line between the conductor and the case is maintained in the compartment where the power capacitor and the conductor are electrically connected together. As a result, a gas-insulated line of the invention remains small in size and can be used on the ground or buried in the ground.

BRIEF DESCRIPTION OF THE DRAWING

Other characteristics and advantages of the invention appear on reading the following description of embodiments given with reference to the drawings.

In the present description, when the same elements appear in various figures, they are given the same references in all of them.

DETAILED DESCRIPTION OF THE INVENTION

The invention relates to a gas-insulated line of an electricity transport grid, the line comprising a conductor disposed inside a case filled with dielectric gas under pressure. Such a line is made, for example, by means of an aluminum or steel tube forming a case having disposed therein an aluminum bar acting as a conductor. When the line is a three-phase line, three bars of this type are placed inside the tube. By way of example, the diameter of the tube is 700 millimeters (mm) and its wall thickness is 8 mm. As mentioned above, the dielectric gas present inside the tube can be constituted, for example, by a mixture of $N_2$ containing 2% to 5% $SF_6$ and at a pressure of 12 bars. It should be observed that when $SF_6$ is released into the atmosphere it increases the greenhouse effect, so it is used in small percentage only in the gas-insulated line for better protection of the environment. The power transport grid to which the gas-insulated line belongs may, for example, be a high voltage grid, i.e. a transport grid operating at a voltage typically lying in the range 200,000 V to 400,000 V.

Figure 1:
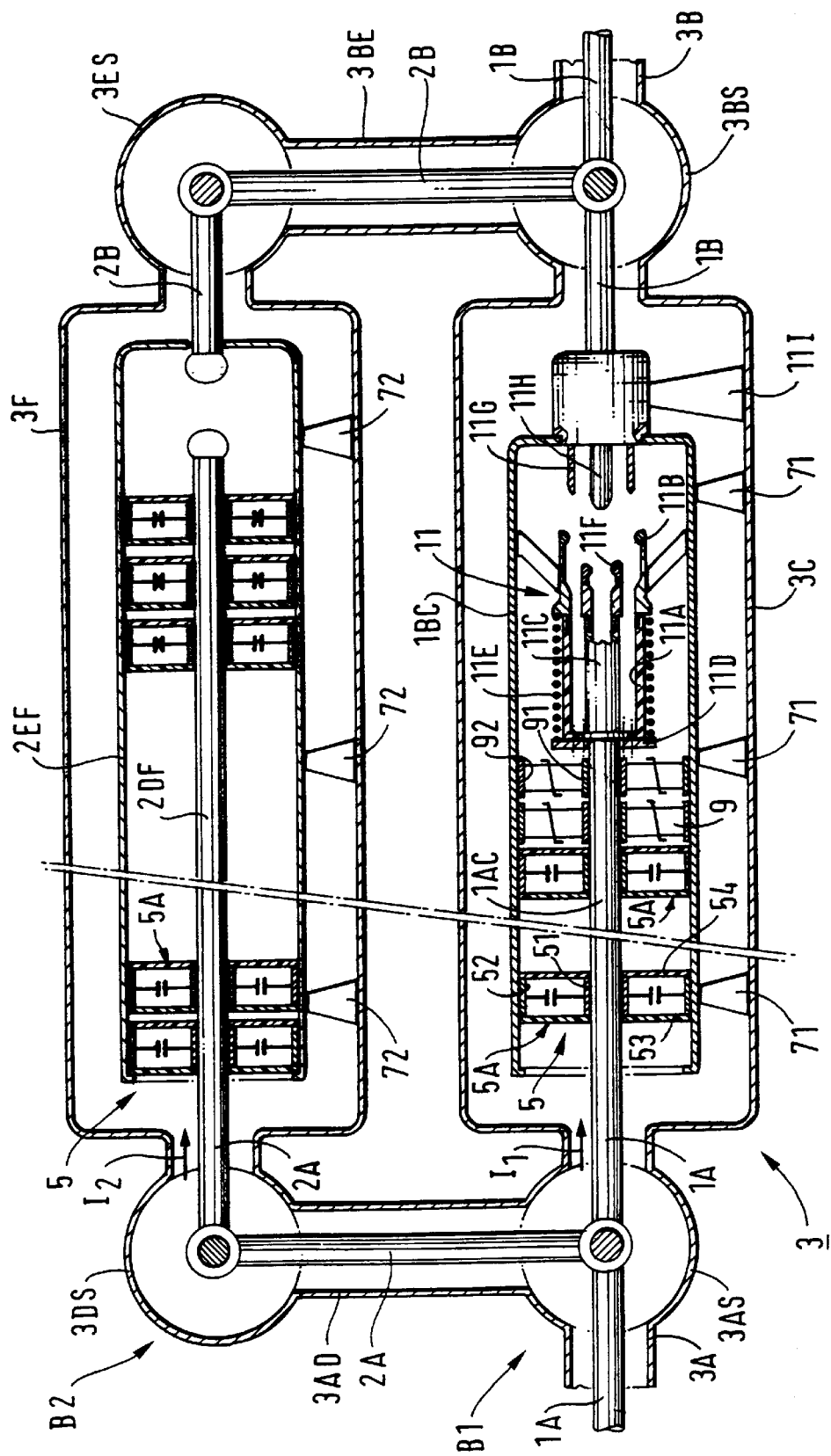
FIG. 1 is a diagram of a gas-insulated line of the invention in which the conductor is connected in series with the power capacitor.

In a first embodiment of the invention, a power capacitor is placed inside a compartment filled with dielectric gas under pressure, and secured to the cases of two portions of gas-insulated line, being electrically connected to the conductors thereof in a series type circuit. In FIG. 1, which shows this type of embodiment, there can be seen on the left a first portion of gas-insulated line of the type described above, and comprising a conductor 1A disposed inside a case 3A. Similarly, on the right of the figure, there can be seen a second portion of gas-insulated line comprising a conductor 1B disposed inside a case 3B. The first and second conductors 1A and 1B are extended respectively by a conductive rod 1AC and by a metal tube 1BC which are contained in an intermediate compartment 3C which is cylindrical in shape and which is secured to the first and second cases 3A and 3B via two branching spheres 3AS and 3BS. The metal tube 1BC is supported inside the intermediate compartment 3C by three identical insulating supports 71 so that it is coaxial with the conductive rod 1AC extending the first conductor 1A. The intermediate compartment 3C and the branching spheres 3AS and 3BS are filled with the same dielectric gas as that described above. They are mechanically interconnected in conventional manner, each being capable of being removed independently of the others, and they constitute a series-connected branch B1. Provision is made for respective circuit breakers to be disposed between the first case 3A and the branching sphere 3AS, and between the sphere 3BS and the second case 3B, which circuit breakers are conventional and not shown and serve to provide electrical disconnection when necessary.

In FIG. 1, it can be seen that the power capacitor 5 is constituted by a battery of identical unit capacitors 5A of annular section enabling them to be mounted by sliding simultaneously around the conductive rod 1AC which extends the first conductor 1A and inside the metal tube 1BC which extends the second conductor 1B. Each unit capacitor 5A is provided with an inner circular electrode 51 which provides sliding electrical contact with the conductive rod 1AC, and with an outer circular electrode 52 which provides sliding electrical contact with the metal tube 1BC. The inner and outer electrodes of each unit capacitor 5A are fixed to two insulating cheek plates 53 and 54 which close the inside volume of each unit capacitor in gastight manner. The identical unit capacitors 5A are stacked by sliding between the conductor rod 1AC and the metal tube 1BC to form a battery of such capacitors which are associated in parallel. In this way, the total electrical capacitance of the battery of capacitors is proportional to the number of unit capacitors 5A that are associated therein, and it is advantageous to select that number as a function of the quantity of capacitive reactive power that is to be compensated in the transport grid to which the gas-insulated line belongs. Conventional means (not shown) are provided to hold the stacked unit capacitors in place between the conductive rod and the metal tube.

In the example of FIG. 1, the power capacitor 5 provides electrical conduction between the conductive rod 1AC and the metal tube 1BC. Insofar as all of the electrical current transported by the branch B1 of the gas-insulated line passes through the power capacitor, the electrical connection between the conductor and the capacitor is of the series type.

In FIG. 1, provision is made to connect the first and second conductors 1A and 1B respectively to first and second conductor segments 2A and 2B to form a branch B2 which is in parallel with the branch B1. In FIG. 1, it can be seen that the first segment 2A branching from the first conductor 1A passes inside the branching sphere 3AS, a link compartment 3AD, a branching sphere 3DS, and a second intermediate compartment 3F in which it is extended in the form of a conductive rod 2DF. Similarly, the second segment 2B branching from the second conductor 1B passes inside the branching sphere 3BS, a link compartment 3BE, a branching sphere 3ES, and the second intermediate compartment 3F in which it is extended by a metal tube 2EF. The metal tube 2EF is supported inside the intermediate compartment 3F by three identical insulating supports 72 so that it is coaxial with the conductive rod 2DF extending the first segment 2A. The link compartments, the branching spheres, and the intermediate compartment of the second branch B2 are filled with the same dielectric gas as the elements forming the first branch B1 in order to provide electrical insulation.

Electrical conduction between the first and second branch segments 2A and 2B is provided by a second power capacitor 5 disposed in the intermediate compartment 3F between the conductive rod 2DF and the metal tube 2EF. Insofar as all of the electrical current transported by the branch B2 of the gas-insulated line passes through the power capacitor, the electrical connection between the conductor and said capacitor is of the series type.

The power capacitor 5 of the second branch B2 is made up of unit capacitors 5A which are identical to those making up the power capacitor of the first branch B1. The identical unit capacitors 5A are stacked by sliding between the conductive rod 2DF and the metal tube 2EF to form a battery of such capacitors associated in parallel. The power capacitor 5 of the second branch B2 is connected in parallel relative to the power capacitor 5 of the first branch B1 in order to increase the total ability of the two batteries to supply capacitive reactive power to the transport grid in which the gas-insulated line is inserted. Using the second branch B2 in parallel with the first branch B1 makes it possible to reduce the length of each of the two branches. By way of example, a typical length for a branch B1 or B2 is 100 m. Provision is also made to provide a third branch, of the same type as those described above, and mounted in parallel therewith, to further increase the total ability of the gas-insulated line to provide capacitive reactive power.

In normal operation, the electrical current transported by the gas-insulated line splits into two currents I1 and I2 which travel through the conductive segments and the power capacitors in each of the two branches B1 and B2 respectively. The potential difference is identical across the terminals of the two power capacitors 5 and determines the "nominal" voltage of each capacitor. The nature and the pressure of the dielectric gas contained in the intermediate compartments, in the link compartments, and in the various branching spheres is selected to withstand the nominal voltage.

In the event of a short circuit, the increase in electric current gives rise to a surge voltage appearing across the terminals of the power capacitors. Provision is made to install varistors which peak-limit the surge voltage, thereby protecting the power capacitors. In FIG. 1, identical varistors 9 of cylindrical shape are housed in insulating tubes which are mounted around the conductive rod 1AC in a radial direction. An inner conductive base 91 connects each varistor electrically to the conductive rod 1AC, and an outer conductive base 92 connects each to the metal tube 1BC, so that they are connected in parallel with the unit capacitors 5A of the power capacitor 5.

A switch is placed between the conductive rod 1AC and the conductive rod 1B in the intermediate compartment 3C and is connected in parallel with the power capacitor to short circuit it, thereby enabling the gas-insulated line to operate without the capacitor. In FIG. 1, a switch 11 comprises a ring of contact fingers 11B carried by an insulating tube 11A secured to the conductive rod 1AC via a metal base 11D. A copper conductor is coiled around the insulating tube 11A to form an inductor 11E connected in series with the switch 11 and electrically connecting the metal base 11D with the contact fingers 11B. A metal tube 11C is disposed inside the insulating tube 11A. It is held at one end to the metal base 1D, and at its opposite end it carries a ring of contact fingers 11F. A tubular contact 11G and a cylindrical contact 11H are disposed coaxially and on the same axis as the insulating tube 11A and the metal tube 11C by means of an insulating support 11I, and they are mounted to move in translation so as to slide respectively against the contact fingers 11B and against the contact fingers 11F. The contact fingers 11F are set back relative to the contact fingers 11B so that when the circuit breaker is closed, the power capacitor 5 is initially shorted by the series-connected inductor, thereby reducing the discharge current from the unit capacitors 5A. Thereafter connection between the contact fingers 11F and the cylindrical contact 11H short circuits the inductor.

Provision is also made to provide the second branch B2 with a controlled discharge gap to provide protection that is complementary to the protection provided by the varistors.

The series connection of the power capacitor with the gas-insulated line as shown in FIG. 1 relates to a single phase line. Nevertheless the invention extends to a gas-insulated line having a plurality of phases. When transporting electrical power in three phases, provision is made to place three pairs of branches identical to the branches B1 and B2 described with reference to FIG. 1 between the two portions of the gas-insulated line, with each pair of branches being connected in series with the segments 1A and 1B of each single-phase conductor of the gas-insulated line.

Figure 2:
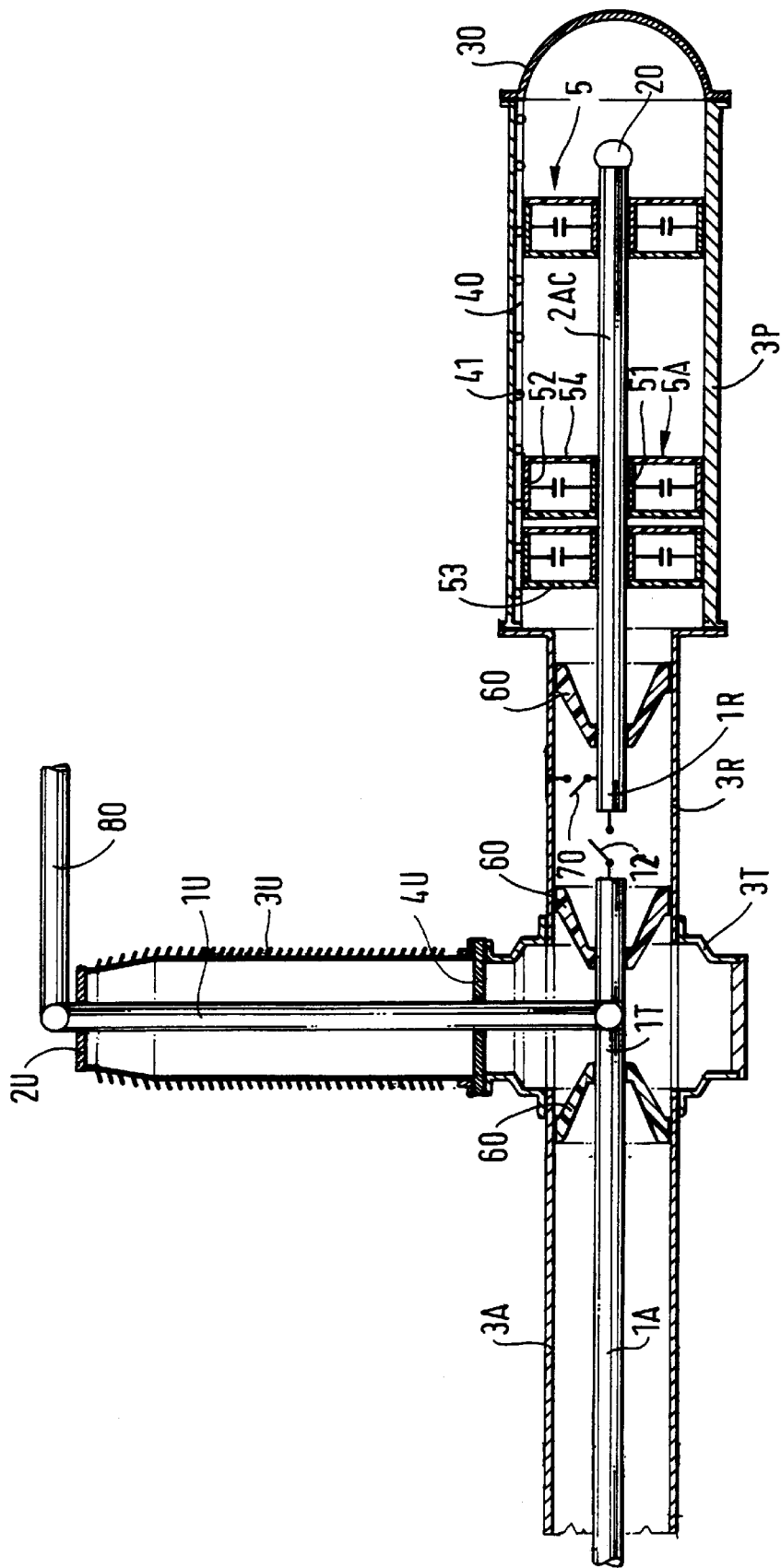
FIG. 2 is a diagram showing a gas-insulated line of the invention in which the conductor is connected in parallel with the power capacitor.

In a second embodiment of the invention, a power capacitor is placed inside a compartment filled with dielectric gas under pressure and secured to the case of the gas-insulated line, being electrically connected to the conductor in a parallel type circuit. This embodiment is shown in FIG. 2 in which there can be seen on the left a single-phase gas-insulated line of the same type as that described above, comprising a conductor 1A disposed inside a case 3A. A power capacitor 5 is placed inside a cylindrical metal compartment 3B which is secured to the case 3A via, from right to left in the figure: an intermediate compartment 1R; and a vessel 3T. The conductor 1A is connected via conductive segments 1T and 1R connected in series and disposed in respective intermediate elements 3T and 3R to a conductive rod 2AC disposed in the metal compartment 3P which contains the power capacitor 5. The case 3A, the metal compartment 3P, and the intermediate elements 3T and 3R are carried to a constant zero potential and are filled with a dielectric gas such as the gas described above, serving to insulate them electrically from the various conductive segments they contain. The mechanical links between these elements are provided in conventional manner, each being capable of being removed independently of the others.

In FIG. 2, it can be seen that the power capacitor 5 is formed by a battery of identical unit capacitors 5A of annular section so as to be mounted by sliding both on the conductive rod 2AC which extends the conductor 1A and inside the metal compartment 3P. The unit capacitors 5A are identical to those described for the embodiment shown in FIG. 1. In particular, each unit capacitor 5A is provided with an inner circular electrode 51 providing sliding electrical contact relative to the rod 2AC, and with an outer circular electrode 52 which provides sliding electrical contact relative to the metal compartment 3P. The inner and outer electrodes of each unit capacitor 5A are fixed to two insulating cheek plates 53 and 54 which close the inside volume of each capacitor in leakproof manner. The identical unit capacitors 5A are stacked by sliding between the conductive rod 2AC and the metal compartment 3P so as to form a battery of such capacitors associated in parallel. In this way, the total electrical capacitance of the battery is proportional to the number of associated unit capacitors 5A, and it is advantageous to select this number as a function of the quantity of capacitive reactive power that needs to be compensated in the transport grid to which the gas-insulated line belongs. The unit capacitors are stacked by sliding by removing the metal compartment 3P to gain easy access to the rod 2AC. Provision is also made to stack the unit capacitors 5A without removing the metal compartment 3P. A gastight end wall 30 is thus removably mounted to give access to the rod 2AC. Three identical bars 40 are provided with wheels 41 and are mounted to run against the inside wall of the metal compartment 3P at 120 degree intervals on three conventional slideways (not shown) to facilitate installing the unit capacitors 5A. Conventional means (not shown) are provided to hold the stacked unit capacitors in place inside the metal compartment 3P. The conductive rod 2AC is terminated by a removable sphere 20 for reducing electrical edge effects relative to the end wall 30 of the metal compartment 3P.

In the example of FIG. 2, the power capacitor 5 provides electrical conduction between the rod 2AC which is at the same potential as the conductor 1A of the gas-insulated line and the metal compartment 3P which is at the same potential as the case 3A. Given that the capacitor is subjected to the entire high voltage as transported by the line, the FIG. 2 circuit is of the parallel type.

The intermediate compartment 3R between the metal compartment 3P and the vessel 3T is closed by two identical insulating cones 60 fixed in one case to the intermediate compartment 3R and in the other case to the conductive segment 1R to provide sealing relative to the dielectric gas present therein. A conventional circuit breaker 12 represented in FIG. 2 merely by an electrical symbol is disposed inside the intermediate compartment 3R and is connected in series with the conductive segment 1T disposed inside the vessel 3T, and with the power capacitor 5 via the conductive segment 1R so that opening the circuit breaker disconnects the power capacitor 5 from the line voltage, thus enabling the gas-insulated line to operate without the capacitor. Provision is also made for a grounding connection 70 to be available inside the intermediate compartment 3R in parallel with the power capacitor. After the circuit breaker 12 has been opened, the unit capacitors 5A discharge to the zero potential of the compartment 3R via the grounding connection 70. Compared with the insulated line described above, it should be observed that the intermediate compartment 3R is preferably filled with pure $SF_6$ at a pressure of about 5 bars.

The vessel 3T is closed firstly relative to the intermediate compartment 3R and secondly relative to the case 3A by insulating cones 60 identical to those of the intermediate compartment 3R. In the example of FIG. 2, an insulating bushing 3U made of porcelain is mounted on one side of the vessel 3T to insulate a conductive segment 1U which is connected in series with the switch 11 via the conductive segment 1T contained in the vessel 3T, and with an overhead line 80 via one end of the insulating bushing 1U. A top base 2U and a bottom annular base 4U close the insulating bushing 1U in a manner that is gastight relative to the dielectric gas present therein. The vessel 3T and the insulating bushing 1U are preferably filled with the same dielectric gas as the intermediate compartment 3R, and at the same pressure. In FIG. 2, it can be seen that the conductive segment 1U disposed inside the bushing 3U forms a grid node between the overhead line and the gas-insulated line, and is connected in series with the power capacitor. In practice, the vessel 3T is mounted on a support on the ground as are the intermediate compartment 3R and the metal compartment 3P. The portion of gas-insulated line which is connected to the grid node is also placed on the ground. The gas-insulated line is extended either by remaining on the ground, or else by being buried. It should be observed that provision is made for the power capacitor 5 to be physically mounted parallel with the gas-insulated line, or perpendicular relative thereto, or indeed in an intermediate direction in order to accommodate particular configurations on the ground.

Figure 3:
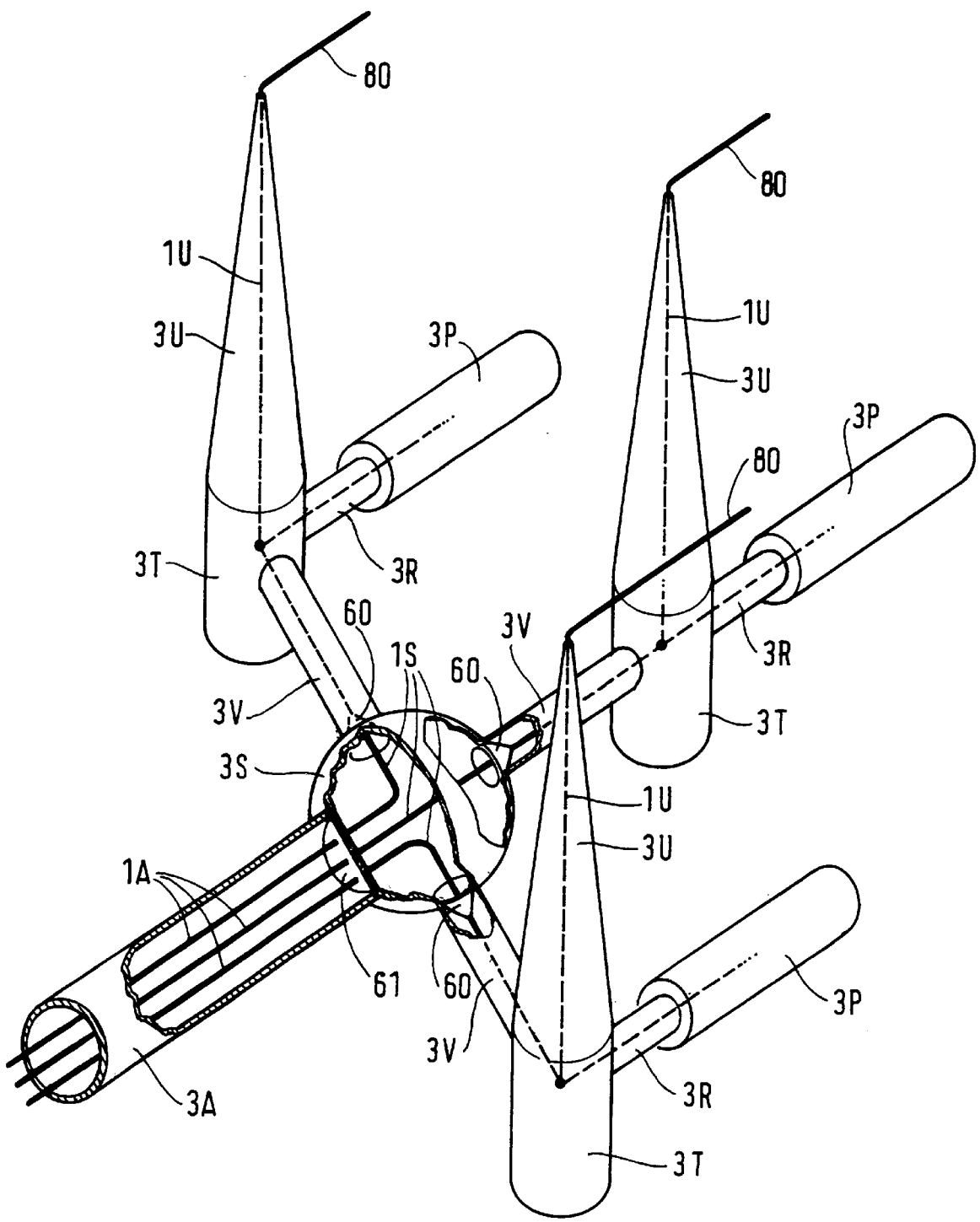
FIG. 3 is a partially-cutaway diagrammatic perspective view of a three-phase gas-insulated line of the invention.

The connection of the power capacitor in parallel with the gas-insulated line as shown in FIG. 2 relates to a single-phase line. When electrical power is being transported by three-phase current, three identical conductors 1A are placed inside the case 3A of the gas-insulated line (see FIG. 3). They are connected to three identical conductor segments 1S disposed in the branching sphere 3S which provides a branch connection for each of the three segments to a respective power capacitor contained in its own metal compartment 3P secured to its own intermediate compartment 3R and its own vessel 3T, in a configuration that is the same as that described with reference to FIG. 2 for a singe-phase gas-insulated line. The example of FIG. 3 shows the case where the three power capacitors are connected in parallel relative to a grid node between the three-phase gas-insulated line and the three phases of a conventional overhead line 80. Each vessel 3T supports a bushing 3U in which there is to be found a conductive segment 1U connected to a respective one of the three segments 1S present inside the branching sphere 3S via a respective link compartment 3V. The branching sphere 3S is closed relative to the case 3A by a gastight wall 61, and relative to the three link compartments 3V via three insulating cones 60 of the type described with reference to FIG. 2 such that the branching sphere and these compartments are tight relative to the pressurized dielectric gas they contain, which may be constituted by $SF_6$ at a pressure of about 5 bars, for example.

Figure 4:
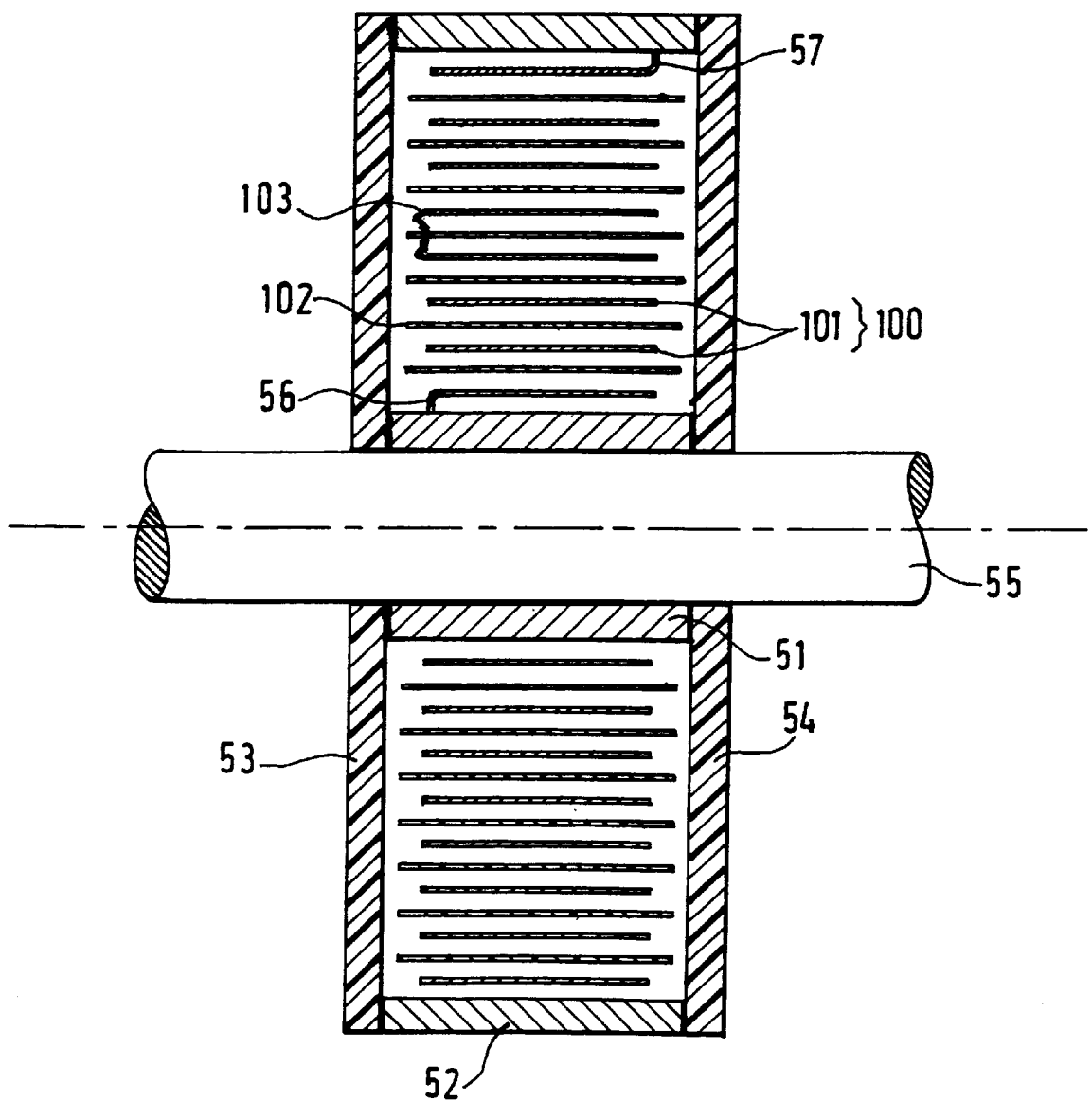
FIG. 4 is a diagrammatic section view of a power capacitor of the invention.

FIG. 4 is a radial section through a unit capacitor 5A of annular shape suitable for stacking onto a conductive rod 55 of the same type as the rods 1AC, 2DF, or 2AC as described with reference to FIGS. 1 and 2. A capacitor element 100 comprises two identical metal strips 101 that are separated by an insulating film 102. The insulating film 102 is preferably wider than the metal strips 101, thereby providing greater creepage line insulation. It should be observed that a capacitor element 100 is typically several hundreds of meters long. A first capacitor element 100 is wound around the inner circular electrode 51 to provide electrical contact 56. An identical second capacitor element 100 is wound around the electrode 51 over the first element 100 and so on until a last capacitor element 100 is in electrical contact 57 with the outer circular electrode 52. The wound capacitor elements are interconnected successively by pieces of metal foil 103 to provide a series connection of capacitors capable of withstanding a voltage as high as that which is used for transport purposes on a gas-insulated line. The inside volume of a capacitor 5A that is closed in leakproof manner by its two insulating cheek plates 53 and 54 is filled with a dielectric gas under pressure such as $SF_6$ in order to increase the dielectric strength of the capacitor. Provision is also made to fill the inside volume of the capacitor 5A with oil, such as castor oil.

What is claimed is:

1. A gas-insulated line of an electrical power transport grid, the line comprising a conductor (1A) disposed inside a case (3A) filled with a dielectric gas under pressure, the line being characterized in that a power capacitor (5) is electrically connected to the conductor, being disposed inside a compartment (3C, 3P) of cylindrical shape secured to the case (3A), filled with a dielectric gas under pressure, and containing a coaxial conductive rod (1AC, 2AC) connected to the conductor (1A), the power capacitor (5) comprising at least one unit capacitor (5A) of annular section mounted around said conductive rod (1AC, 2AC), in electrical contact with said conductive rod (1AC, 2AC) via an inner electrode (51), and in electrical contact with a metal tube (1BC, 3P) coaxial with said conductive rod (1AC, 2AC) via an outer electrode (52).

2. A gas-insulated line according to claim 1, in which the inner and outer electrodes (51 and 52) make sliding contact with said conductive rod (1AC, 2AC) and with said metal tube (1BC, 3P), respectively.

3. A gas-insulated line according to claim 1, in which the power capacitor is electrically connected in parallel with the conductor (1A), said metal tube (3P) constituting said compartment.

4. A gas-insulated line according to claim 1, in which the power capacitor is electrically connected in series with the conductor (1A), said metal tube (1BC) being disposed inside said compartment (3C).

5. A gas-insulated line according to claim 3, in which the compartment (3P) is secured to the case (3A) via a second compartment (3R) which is filled with a dielectric gas under pressure and which contains a circuit breaker (12) electrically connected in series with the power capacitor (5).

6. A gas-insulated line according to claim 5, in which a grounding connection (70) is secured to the second compartment (3R) and is electrically connected in parallel with the power capacitor (5).

7. A gas-insulated line according to claim 5, in which the second compartment (3R) is secured to the case (3A) by a vessel (3T) which is filled with a dielectric gas under pressure, and which contains a conductive segment (1T) electrically connected in series with the switch (11).

8. A gas-insulated line according to claim 7, in which said vessel (3T) is surmounted by an insulating bushing (3U) filed with dielectric gas under pressure and containing a conductive segment (1U) electrically connected in series with the switch (11) and with an overhead line (80) supported by the insulating bushing (3U).

9. A gas-insulated line according to claims 1, in which the power capacitor (5) is mounted physically in parallel with or perpendicular to the gas-insulated line, or in a direction that is intermediate between parallel and perpendicular.

10. A gas-insulated line according to claim 3, in which a conductive rod (1AC) is electrically connected to the conductor (1A) of a first portion of the gas-insulated line, and a metal tube (1BC) is electrically connected to the conductor (1B) of a second portion of line, the conductive rod (1AC) and the metal tube (1BC) being disposed in the compartment (3C) which is cylindrical in shape and which is secured to the cases (3A, 3B) of the two line portions.

11. A gas-insulated line according to claim 10, in which a varistor (9) is disposed between the conductor rod (1AC) and the metal tube (1BC) and is electrically connected in parallel with the power capacitor.

12. A gas-insulated line according to claim 10, in which a switch (11) is disposed between the conductive rod (1AC) and the conductor (1B) and is electrically connected in parallel with the power capacitor (5).

13. A gas-insulated line according to claim 12, in which the switch (11) comprises an electrically series-connected inductor (11E) and two contacts (11G, 11H) movable relative to two rings of contact fingers 911F, 11B) which are fixed relative to the switch (11), with one of the rings (11F) being set back relative to the other ring (11B).

14. A gas-insulated line according to claim 10, in which a second power capacitor (5) is disposed in a second compartment (3F) filled with a dielectric gas under pressure and secured to the first compartment (3C) in which the first power capacitor (5) is disposed, the two power capacitors being electrically connected in parallel relative to each other.

15. A gas-insulated line according to claim 1, in which the power capacitor (5) comprises a plurality of identical unit capacitors (5A) stacked around the conductive rod (1AC, 2AC) to form a battery of such unit capacitors electrically connected in parallel.

16. A gas-insulated line according to claim 1, in which each unit capacitor (5A) comprises capacitor elements (100) which are wound around the inner electrode (51) to the outer electrode (52) and which are successively electrically interconnected in series with one another by pieces of metal foil (103).

17. A gas-insulated line according to claim 16, in which the inner and outer electrodes (51, 52) are held by two insulating cheek plates (53, 54) that are mounted in leak-proof manner.

18. A gas-insulated line according to claim 17, in which each unit capacitor (5A) is filled with a dielectric gas under pressure.

19. A gas-insulated line according to claim 17, in which each unit capacitor (5A) is filled with oil.

20. The gas-insulated line according to claim 1 provided in a single-phase or three-phase gas insulated line for transport of electrical power.

* * * * *